United States Patent [19]

Hendrix

[11] Patent Number: 5,195,768
[45] Date of Patent: Mar. 23, 1993

[54] TOWING HITCH BALL MOUNT FOR AUTOMATICALLY ACTIVATING TOWED VEHICLE BRAKES

[76] Inventor: William A. Hendrix, 326 N. Bowen Rd., #101, Arlington, Tex. 76012

[21] Appl. No.: 797,304

[22] Filed: Nov. 25, 1991

[51] Int. Cl.⁵ ............................................. B60T 13/08
[52] U.S. Cl. .................................. 280/428; 280/446.1; 280/511; 188/112 R
[58] Field of Search ............... 280/420, 428, 430, 432, 280/457, 487, 455.1, 421, 511, 486, 483, 446.1; 188/3 R, 112 R, 134; 180/14.6

[56]  References Cited

U.S. PATENT DOCUMENTS

| 1,824,554 | 9/1931 | Lathers | 188/112 R |
| 2,497,016 | 2/1950 | Roberts | 188/112 R |
| 3,173,518 | 3/1965 | Sill | 188/112 R |
| 3,318,422 | 5/1967 | Frescura | 188/112 R |
| 3,448,834 | 6/1969 | Lammers | 188/112 R |
| 3,845,846 | 11/1974 | Sundermann | 188/112 R |
| 4,840,256 | 6/1989 | Webb | 280/446.1 |

FOREIGN PATENT DOCUMENTS

| 0137954 | 5/1949 | Australia | 188/3 R |
| 0295883 | 8/1928 | United Kingdom | 188/112 R |

Primary Examiner—David M. Mitchell
Assistant Examiner—Anne Marie Boehler
Attorney, Agent, or Firm—Donald A. Kettlestrings

[57] ABSTRACT

A towing hitch ball mount is adapted for telescopic use with a conventional towing hitch ball mounted receiver for automatically controlling the brakes of the towed vehicle. A pulley system having a flexible line or cable is mounted within the ball mount so that the cable is drawn into the ball mount as the towing vehicle is braked to simultaneously apply the brakes of the towed vehicle.

25 Claims, 4 Drawing Sheets

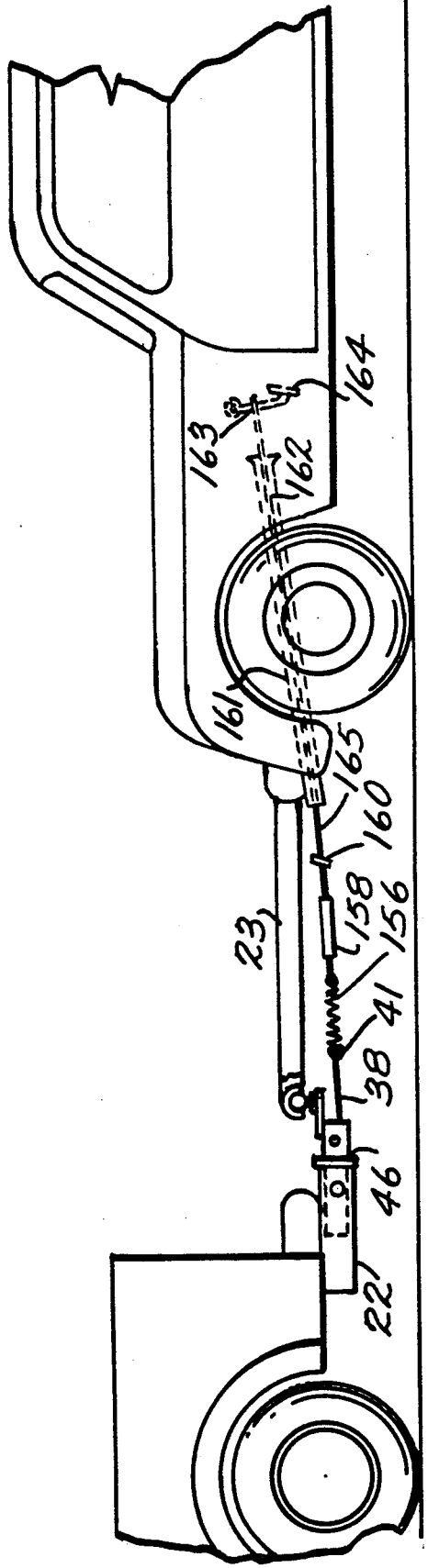
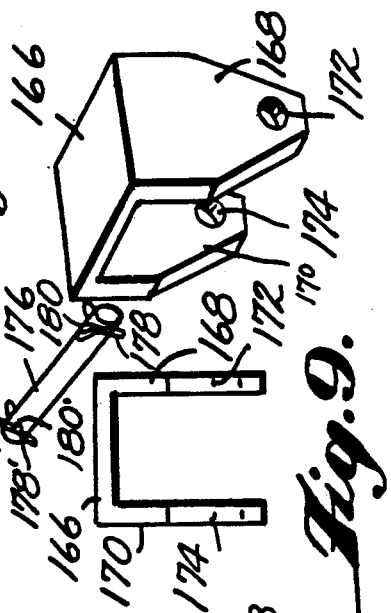
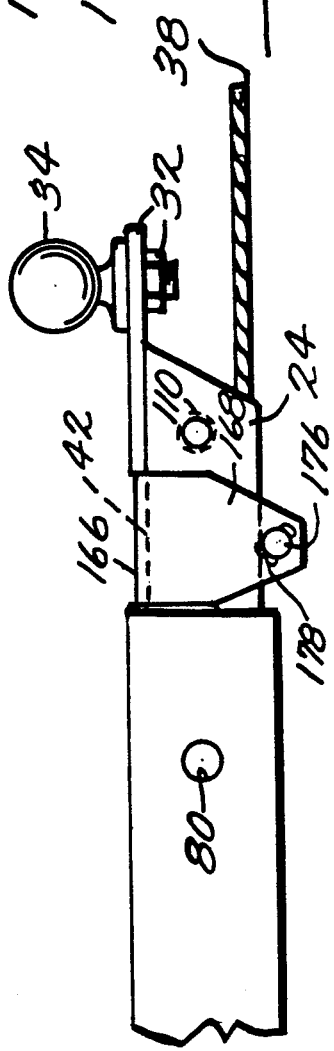

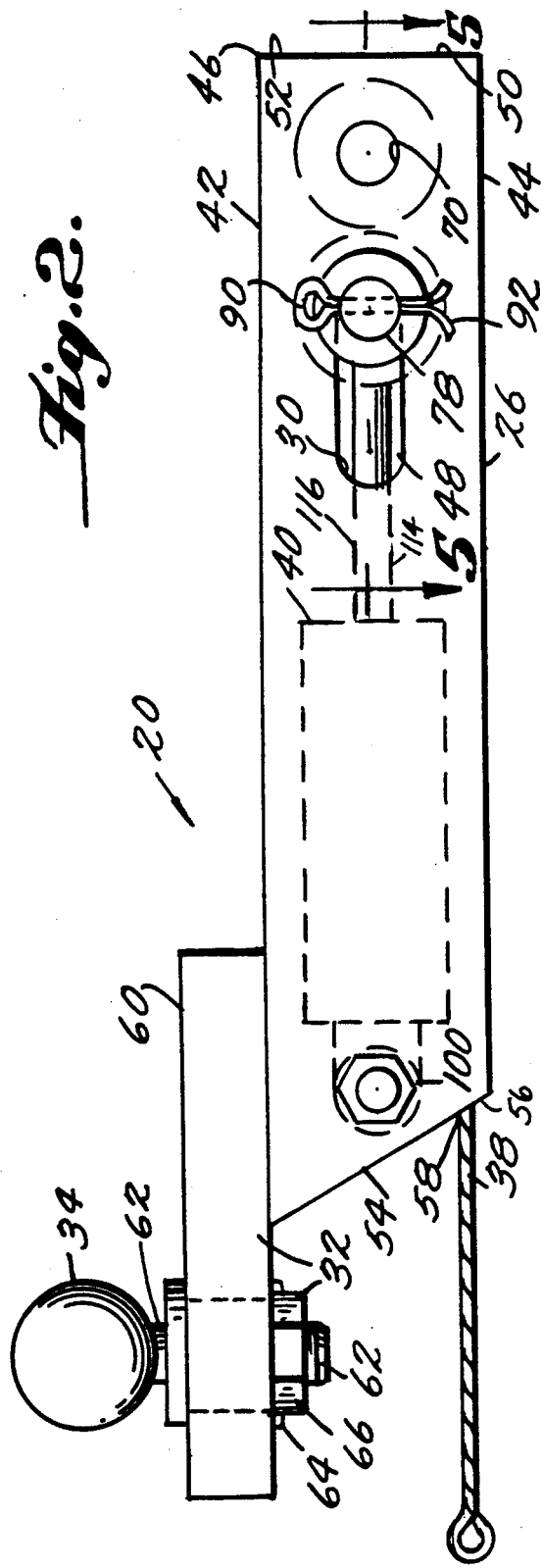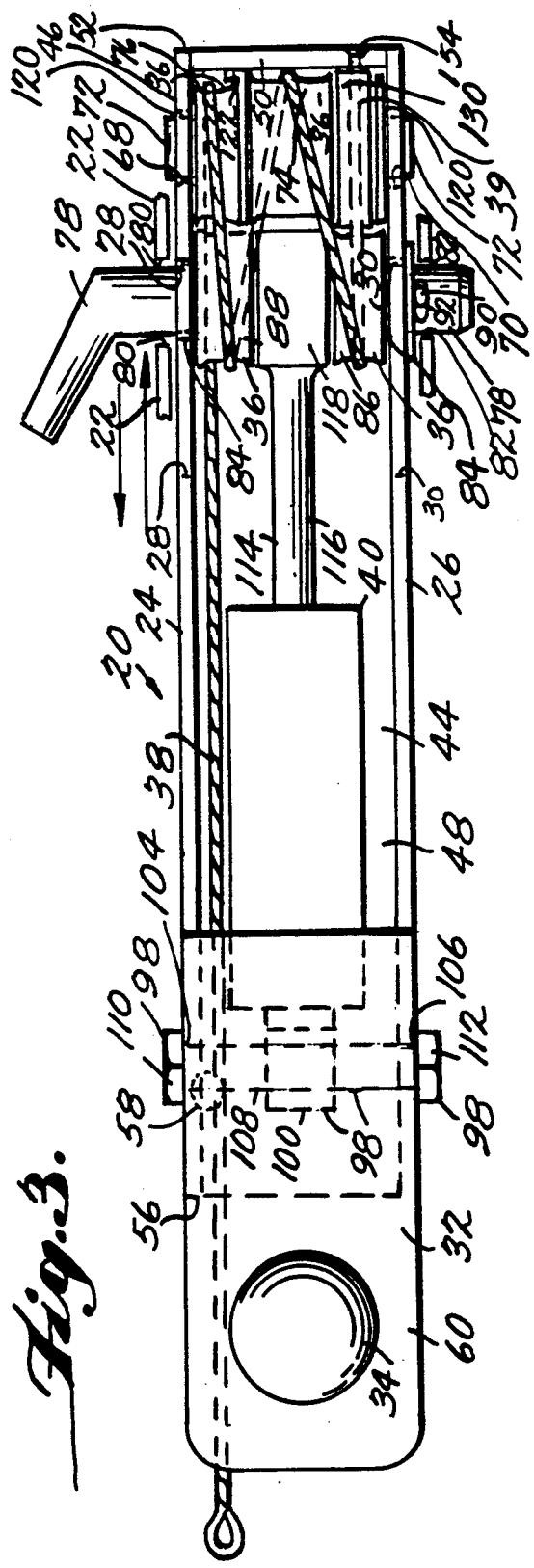

TOWING HITCH BALL MOUNT FOR AUTOMATICALLY ACTIVATING TOWED VEHICLE BRAKES

This invention relates to an automatic brake activating system and more particularly to a towing hitch ball mount adapted for telescopic use with a conventional towing hitch ball mount receiver and for automatically controlling the brakes of a towed vehicle.

Automatic braking systems for activating brakes of towed vehicles are well known. Examples of such systems are described in U.S. Pat. Nos. 1,824,554; 2,497,016; 3,173,518; 3,318,422 and 3,845,846.

Systems are presently in use which are incorporated into tow bars. The automatic brake actuating mechanism is contained within the tow bar itself. The problem with such an arrangement is that many people already own a standard type tow bar and are reluctant to purchase another which incorporates the automatic brake feature because tow bars incorporating the automatic brake feature are typically larger, heavier, harder to hook up and much more expensive than conventional tow bars.

It is, therefore, an object of the present invention to provide apparatus within a towing hitch ball mount for automatically activating towed vehicle brakes.

Another object is to provide a towing hitch ball mount for automatically activating towed vehicle brakes so that conventional tow bars can be used with the ball mount.

A further object of the invention is the provision of a towing hitch ball mount for automatically activating towed vehicle brakes wherein the ball mount is only a few pounds heavier than a conventional towing hitch ball mount.

Another object is to provide such a towing hitch ball mount which is easy to install and inexpensive to manufacture.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides a new towing hitch ball mount adapted for telescopic use with a conventional towing hitch ball mount receiver that is attached to a towing vehicle and wherein the ball mount can automatically control the brakes of a towed vehicle. The ball mount includes first and second opposed, substantially parallel elements, the elements respectively defining first and second opposed, elongated openings; means in operative relationship with the first and second elements for connecting a hitch ball element to the first and second elements; pulley means mounted between the first and second elements in operative relationship with the first and second openings and with the ball mount receiver for predetermined movement when the ball mount telescopically moves with respect to the ball mount receiver; a flexible line or cable adapted to be removably connected to a brake system of a towed vehicle and in operative relationship with the pulley means for enabling control of the towed vehicle's brake system as the ball mount and the ball mount receiver move telescopically with respect to each other; and shock absorbing means in operative relationship with the pulley means and with the first and second elements for moderating movement of the pulley means.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

FIG. 1 is a side elevation view showing the towing hitch ball mount of this invention attached to a conventional towing hitch ball mount receiver and connected to a vehicle to be towed;

FIG. 2 is a side elevation view of of the ball mount;

FIG. 3 is a top plan view of the ball mount with a portion removed to better show the elements located within the ball mount;

FIG. 8 is a fragmentary side elevation view showing a U-shaped element positioned on the ball mount for enabling the hitch to function in the manner of a conventional hitch without the automatic braking feature;

FIG. 9 is an end elevation view of the U-shaped element shown in FIG. 8; and

FIG. 10 is a perspective view of the U-shaped element and a pin or bolt for holding the U-shaped element in position on the ball mount.

Figure 4:
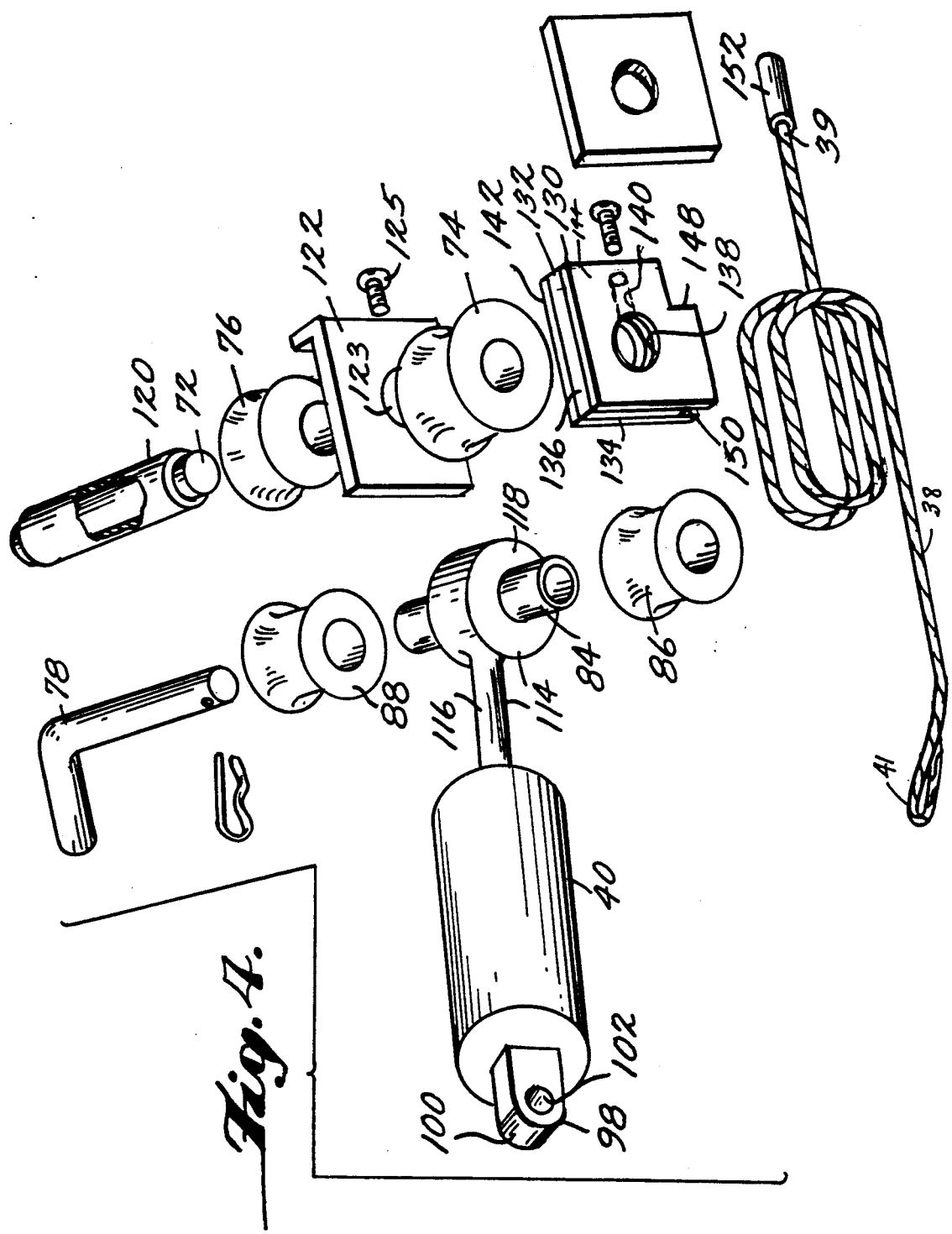
FIG. 4 is an exploded perspective view of elements located with the ball mount.
Figure 5:
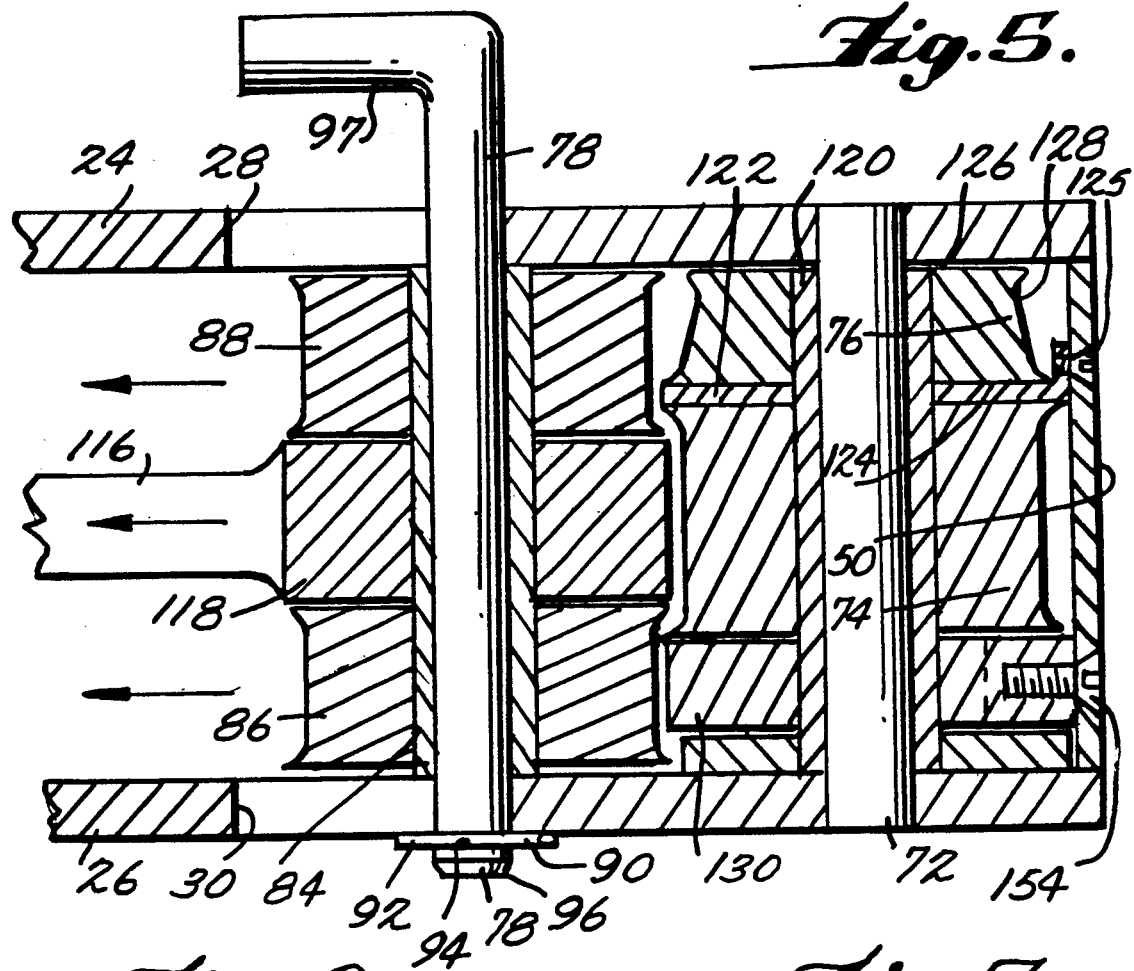
FIG. 5 is a fragmentary cross-sectional view taken along the line 5—5 in FIG. 2 and looking in the direction of the arrows.

With reference now to the drawings, wherein like reference characters designate like or corresponding parts throughout the several views, there is shown a towing hitch ball mount 20 in accordance with this invention. Ball mount 20 is adapted for telescopic use with a conventional towing hitch ball mount receiver 22 that is attached to a towing vehicle in a conventional manner.

Ball mount 20 includes first and second opposed, substantially parallel and planar elements 24, 26, and each of elements 24, 26, respectively defines first and second opposed, elongated openings 28, 30 therein.

Means generally indicated at 32 are provided in operative relationship with elements 24, 26 for connecting a hitch ball element 34 to elements 24, 26.

Pulley means generally indicated at 36 are mounted between elements 24, 26 in operative relationship with openings 28, 30 and with ball mount receiver 22 for predetermined movement when ball mount 20 telescopically moves with respect to ball mount receiver 22.

A flexible line or cable 38 adapted to be removably connected to a brake system of a towed vehicle, as will be hereinafter explained in more detail, is provided in operative relationship with pulley means 36 for enabling control of the towed vehicle's brake system as ball mount 20 and ball mount receiver 22 move telescopically with respect to each other. Shock absorbing means 40 are provided in operative relationship with pulley means 36 and with elements 24, 26 for moderating movement of pulley means 36.

Ball mount 20 includes third and fourth opposed elements 42, 44 connected between elements 24, 26 to form an elongated substantially square tubular member 46 which defines an interior space 48 for housing pulley means 36 and shock absorber 40.

In order to partially enclose tubular member 46, ball mount 20 preferably includes a first end element 50 connected to elements 24, 26, 42 and 44 at a first or forward end 52 of tubular member 46 to enclose interior space 48 at first end 52. In order to further enclose space 48, ball mount 20 preferably includes a second end element 54 connected to elements 24, 26, 42 and 44 at a second or rearward end 56 of tubular member 46 to substantially enclose interior space 48 at second end 56. Second end element 54 defines a third opening 58 therein for slidably receiving flexible line or cable 38.

In accordance with the invention, connecting means generally indicated at 32 preferably includes a plate element 60 connected to elements 24, 26 and 42 and projecting beyond second or rearward end 56 of tubular member 46. Plate element 60 preferably defines a hole 62 therein for removably receiving a portion of hitch ball element 34. Typically, hitch ball element 34 may include a threaded shaft 62, and a washer 64 and nut 66 are conventionally positioned over shaft 62 and tightened against the underside of plate element 60 to hold hitch ball element 34 in position on and projecting above plate element 60.

The design and configuration of ball mount 20 and of plate element 60, in particular, is such that ball mount 20 can be inverted in position prior to being inserted into ball mount receiver 22. This feature will enable ball mount 20 to provide a lower or higher height for hitch ball element 34 as needed.

First and second opposed elements 24, 26 further respectively define first and second opposed apertures 68, 70 therein. Pulley means generally indicated at 36 include a first pin element 72 extending between and positioned within opposed apertures 68, 70. Pulley means 36 further include a first pulley 74 rotatably mounted on first pin element 72 and a second pulley 76 rotatably mounted on first pin element 72 in substantially side-by-side relationship with first pulley 74.

In accordance with the invention, pulley means 36 further include a second removable pin element 78 for substantially simultaneous removable insertion through third and fourth opposed apertures 80, 82 of conventional ball mount receiver 22 and through elongated openings 28, 30 of ball mount 20. Pulley means 36 further include a first bushing element 84 positioned in alignment with openings 28, 30 and of a size for slidably receiving second pin element 78 within bushing element 84.

Pulley means 36 further include a third pulley 86 rotatably mounted on first bushing element 84 and a fourth pulley 88 rotatably mounted on first bushing element 84 in substantially side-by-side relationship with pulley 86.

Pulley means 36 further include means generally indicated at 90 in operative relationship with second pin element 78 for removably retaining pin element 78 in position through apertures 80, 82, through elongated openings 28, 30 and through bushing element 84. Retaining means 90 may typically be a cotter pin 92 adapted to be inserted through opening 94 adjacent to end 96 of pin 78, and end 97 of pin 78 is bent to cooperate with cotter pin 92 to hold pin 78 in position.

Ball mount 20 further includes first means generally indicated at 98 for connecting shock absorber 40 to opposed, planar elements 24, 26. Connecting means 98 preferably includes a connecting element or boss 100 attached in a conventional manner to shock absorber 40 and defining an opening 102 therein. Connecting means 98 further include opposed openings 104, 106 located respectively within elements 24, 26 and located adjacent to rearward end 56 of tubular member 52. Connecting means 98 further includes a bolt or pin element 108 which extends through openings 102, 104 and 106. Nuts 110, 112 are connected to opposite ends of pin element 108 for tightening against and retaining pin element 108 in position between elements 24, 26.

Ball mount 20 further includes second means generally indicated at 114 for connecting shock absorber 40 to first bushing element 84. Connecting means 114 preferably includes a pin element 116 which extends from shock absorber 40, and an eyelet or holding element 118 attached to pin element 116 and to bushing element 84.

Pulley means 36 further includes a second bushing element 120 rotatably positioned over first pin element 72 and between pin element 72 and pulleys 74, 76. A spacer element 122 defines an opening 123 therein for slidably receiving bushing element 120 therein, and spacer element is attached to end element 50 by a screw or other fastening element 125. Spacer element 122 is positioned between pulleys 74 and 76 for preventing interference between pulleys 74, 76 during operation of the pulleys.

Second pulley 76 defines an inner face 124 substantially adjacent to first pulley 74 and immediately adjacent to spacer 122. Pulley 76 further defines an opposed outer face 126 positioned adjacent to first element 24, and an outer rim 128 extends between faces 126, 128. Rim 128 is tapered so that it is reduced in circumference from inner face 124 to outer face 126 and cable 38 is directed away from shock absorber 40 to avoid cable abrasion.

Pulleys 74, 76, 86 and 88 are substantially equal to each other in diameter, and pulley 74 is preferably substantially twice as wide as pulley 76. Pulleys 86, 88 are preferably substantially equal in width to each other.

Figure 6:
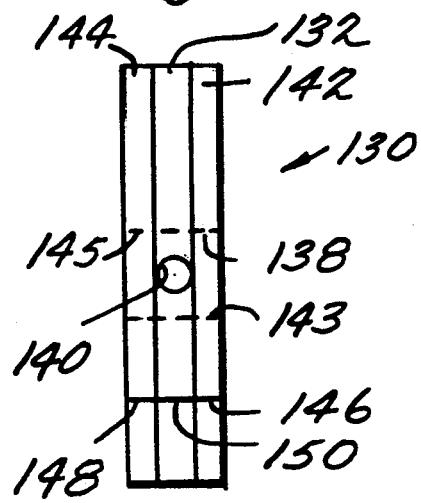
FIG. 6 is a rear end view of an element for holding one end of a cable within the ball mount.
Figure 7:
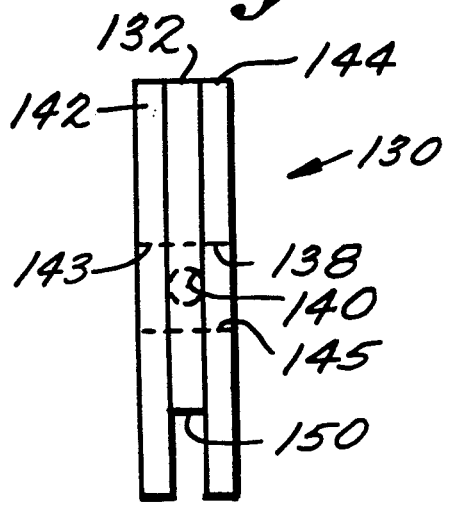
FIG. 7 is a forward end view of the element shown in FIG. 6.

In accordance with the invention, ball mount 20 further includes means generally indicated at 130 in operative relationship with pin element 72 and with flexible line or cable 38 for holding a first end 39 of line or cable 38 in fixed position with respect to pin element 72. Holding means 130 can be machined as a one-piece unit or may include a first, substantially flat element 132 which defines opposed length edges 134, 134' and opposed width edges 136, 136' of predetermined dimensions. Element 132 further defines a central opening 138 therein for slidably receiving first pin element 72. Flat element 132 further preferably defines a threaded screw-receiving opening 140 extending between central opening 138 and edge 134'. Holding means 130 may further include second and third substantially flat elements 142, 144, each defining length dimensions substantially equal to the dimension of lengthwise edges 134, 134' and each defining width dimensions greater than the dimension of width edges 136, 136'. Each of elements 142, 144 defines a notch 146, 148, respectively, in a corner, as illustrated in FIG. 6. Each of elements 142, 144 also defines an opening 143, 145, respectively, for slidably receiving pin element 72.

Elements 142, 144 are attached, for example by spot welding, each to one side of first flat element 132 with notches 146, 148 in alignment with each other and forming a U-shaped channel 150 along lengthwise edge 136' of element 132 between elements 142, 144. Holding means 130 further include a stopper element 152 attached to first end 39 of flexible line 38 and positioned within notches 146, 148 adjacent to channel 150. The dimensions of stopper element 152 are sufficient to prevent movement of stopper element 152 through channel 150. Flexible line 38 extends from stopper element 152 and through channel 150 to third pulley 86. Flexible line 38 then extends in sequence over third pulley 86, over first pulley 74, over fourth pulley 88, over second pulley 76 and outwardly beyond elements 24, 26 and beyond rearward end 56 of tubular member 46.

A fastening element or setscrew 154 extends through first end element 50 and into threaded opening 140 for maintaining holding means 130 in substantially fixed position with respect to end element 50.

Flexible line 38 defines a second end 41 positioned beyond elements 24, 26 and beyond rearward end 56 of tubular member 46. A spring 156 is connected to second end 41 of line 38, a turnbuckle 158 is connected to spring 156, and means 160 are connected to turnbuckle 158 for enabling disconnecting of the towed vehicle from the towing vehicle.

In accordance with the invention, a cable housing 161 is provided for attachment to a towed vehicle. A cable 162 passes through cable housing 161 and is adapted to be removably connected to a brake peddle 164 of the towed vehicle. Cable 162 is connected to disconnecting means 160 for enabling cable 162 to be releasably connected to flexible line or cable 38.

A substantially U-shaped element 166 of predetermined size is provided for removable placement onto element 42 of tubular member 46 and between plate element 60 and ball mount receiver 22 for preventing telescopic movement of ball mount 20 with respect to ball mount receiver 22. This is best shown in FIG. 8.

U-shaped element 166 defines a pair of opposed, parallel side elements 168, 170, and side elements 168, 170 respectively define opposed openings 172, 174. A bolt 176 is provided for removable insertion through side element openings 172, 174 to hold U-shaped element 166 in position on element 42 and on tubular member 46, and nuts (not shown) can be threaded onto ends of bolt 176 or cotter pins 178, 178' can be inserted through openings 180, 180' of pin element 176 to hold bolt 176 in position within openings 172, 174. U-shaped element 166 enables ball mount 20 to be used with ball mount receiver 22 in a conventional manner without the automatic braking feature and when the towed vehicle is to be backed by the towing vehicle.

In operation, conventional towing hitch ball mount receiver 22 is attached to the rear of a towing vehicle in a conventional manner, and a conventional tow bar 23 is connected in a conventional manner to the front portion of a vehicle to be towed.

Ball mount 20 with hitch ball element 34 attached thereto, as previously described, is slidably inserted into receiver 22 with the end of ball mount 20 having hitch ball element 34 attached thereto being positioned rearwardly of receiver 22 so that hitch ball element 34 can be conventionally attached to tow bar 23.

Ball mount 20 is positioned with bushing element 84 in alignment with apertures 80, 82 of receiver 22, and pin element 78 is then slidably inserted through apertures 80, 82 and through bushing element 84. Cotter pin 92 is then inserted through opening 94 within pin element 78 to retain pin element 78 in position.

Cable housing 161, having cable 162 slidably positioned therein, is positioned in a conventional manner within the vehicle to be towed, and a first end 163 of cable 162 is attached in a conventional manner to brake pedal 164 of the vehicle to be towed. Opposite end 165 of cable 162 is connected in a conventional manner to disconnecting means or release pin 160. Spring 156 and turnbuckle 158 are typically already connected to second end 41 of cable 38, and release pin or disconnecting means 160 connects turnbuckle 158 to end 165 of cable 162. Spring 156 is sized to prevent excessive tension on brake pedal 164 and turnbuckle 158 allows for length adjustments of the connection between ball mount 20 and brake pedal 164. Release pin 160 allows disconnecting when the two vehicles are unhooked.

When the brakes of the towing vehicle are applied, ball mount 20 is pushed forward within receiver 22 by the inertia of the towed vehicle. As ball mount 20 slides forward inside receiver 22, pulleys 86, 88 are forced to move away from fixed pulleys 74, 76 to cause cable 38 to be retracted into tubular member 46 of ball mount 20. This, in turn, pulls on brake pedal 164 via spring 156, turnbuckle 158, release pin 160 and cable 162 so that the brakes of the towed vehicle are applied.

As the towed vehicle's brakes are applied, the forward force on ball mount 20 is reduced and ball mount 20 is permitted to move rearwardly with respect to receiver 22. This causes pulleys 86, 88 to move back toward fixed pulleys 74, 76 and tension on cable 38 and on cable 162 is reduced together with the application of force by cable 162 on brake pedal 164. As a result, the system is self-modulating.

Elongated openings 28, 30 within ball mount 20, for example, may be approximately one and one-quarter inches in length to permit ball mount 20 to slide fore and aft within receiver 22 approximately one and one-quarter inches. As the inertia of the towed vehicle pushes ball mount 20 forwardly into receiver 22 of the hitch, movable pulleys 86, 88 will move away from stationary pulleys 74, 76 at a four to one mechanical advantage. For each one-quarter inch that ball mount 20 moves forwardly within receiver 22, cable 38 will be retracted into ball mount 20 by one inch. Because there is available approximately one and one-quarter inches of movement of ball mount 20 with respect to receiver 22, the system has the ability to pull brake pedal 164 five inches, which is sufficient to actuate the brakes on all vehicles. Shock absorber 40, which may be a conventional hydraulic shock absorber, causes the action to work smoothly during the braking process.

If it is desired that the hitch operate in a conventional manner or when the towed and towing vehicles are to be backed, U-shaped element 166 is positioned onto tubular member 46, as shown in FIG. 8, with U-shaped element 166 located between receiver 22 and plate element 60. U-shaped element 166 can be quickly and easily removed from the hitch assembly whenever the automatic braking feature is desired to be reinstated.

This invention provides an automatic braking system which is compactly incorporated within a towing hitch ball mount that is otherwise substantially conventional in appearance, configuration and dimensions. The ball mount of this invention is inexpensive and can replace existing ball mounts without significant additional cost. Conventional tow bars can be used with the ball mount of the invention, and the use of special and expensive tow bars to achieve the automatic braking feature can be avoided. The ball mount of this invention is only slightly heavier than a conventional ball mount and it is simple to install in a conventional hitch receiver.

The invention in its broader aspects is not limited to the specific details shown and described, and departures may be made from such details without departing from the principles of the invention and without sacrificing its chief advantages.

What is claimed is:

1. A towing hitch ball mount adapted for telescopic use with a towing hitch ball mount receiver attached to a towing vehicle and for automatically controlling brakes of a towed vehicle, said ball mount comprising:
    first and second opposed, substantially parallel elements, said elements respectively defining first and second opposed, elongated openings;
    means in operative relationship with said first and second elements for connecting a hitch ball element to said first and second elements;
    pulley means mounted between said first and second elements in operative relationship with said first and second openings and with said ball mount receiver for predetermined movement when said ball mount telescopically moves with respect to said ball mount receiver;
    a flexible line adapted to be removably connected to a brake system of a towed vehicle and in operative relationship with said pulley means for enabling control of said towed vehicle's brake system as said ball mount and said ball mount receiver move telescopically with respect to each other; and
    shock absorbing means in operative relationship with said pulley means and with said first and second elements for moderating movement of said pulley means.

2. A ball mount as in claim 1 further including third and fourth opposed elements connected between said first and second elements to form an elongated tubular member defining an interior space housing said pulley means.

3. A ball mount as in claim 2 further including a first end element connected to said first, second, third and fourth elements at a first end of said tubular member to enclose said interior space at said first end.

4. A ball mount as in claim 3 further including a second end element connected to said first, second, third and fourth elements at a second end of said tubular member to enclose said interior space at said second end, said second end element defining a third opening therein for slidably receiving said flexible line.

5. A ball mount as in claim 2 wherein said connecting means include a plate element connected to said first, second and third elements and projecting beyond said second end of said tubular member, said plate element defining a hole therein for removably receiving a hitch ball element.

6. A ball mount as in claim 5 further including a hitch ball element extending through said hole and attached to said plate element.

7. A ball mount as in claim 5 wherein said first and second opposed elements further respectively define first and second opposed apertures, and wherein said pulley means include:
    a first pin element extending between said first and second opposed apertures;
    a first pulley rotatably mounted on said first pin element; and
    a second pulley rotatably mounted on said first pin element in substantially side-by-side relationship with said first pulley.

8. A ball mount as in claim 7 wherein said conventional ball mount receiver defines third and fourth opposed apertures therein and wherein said pulley means further include:
    a second pin element adapted for simultaneous removable insertion through said third and fourth apertures and through said first and second elongated openings;
    a first bushing element positioned in alignment with said first and second elongated openings and adapted to slidably receive said second pin element;
    a third pulley rotatably mounted on said first bushing element;
    a fourth pulley rotatably mounted on said first bushing element in substantially side-by-side relationship with said third pulley; and
    means in operative relationship with said second pin element for removably retaining said second pin element in position through said third and fourth apertures, through said first and second elongated openings and through said first bushing element.

9. A ball mount as in claim 8 further including:
    first means for connecting said shock absorbing means to said first and second opposed elements; and
    second means for connecting said shock absorbing means to said first bushing element.

10. A ball mount as in claim 9 wherein said pulley means further includes a second bushing element rotatably positioned over said first pin element and between said first pin element and said first and second pulleys.

11. A ball mount as in claim 10 further including a spacer element rotatably positioned on said second bushing element and between said first and second pulleys.

12. A ball mount as in claim 8 wherein said second pulley defines an inner face substantially adjacent to said first pulley, an opposed outer face positioned substantially adjacent to said second element and an outer rim extending between said faces, said rim being tapered to reduce in circumference from said inner face to said outer face.

13. A ball mount as in claim 12 wherein said first, second, third and fourth pulleys are substantially equal to each other in diameter.

14. A ball mount as in claim 13 wherein said first pulley is substantially twice as wide as said second pulley.

15. A ball mount as in claim 14 wherein said third and fourth pulleys are substantially equal in width to each other.

16. A ball mount as in claim 7 further including a first end element connected to said first, second, third and fourth elements at a first end of said tubular member to enclose said interior space at said first end.

17. A ball mount as in claim 16 further including means in operative relationship with said first pin element and with said flexible line for holding a first end of said flexible line in fixed position with respect to said first pin element.

18. A ball mount as in claim 17 wherein said holding means include:
    a first, substantially flat element defining length and width edges of predetermined dimensions, defining a central opening therein for slidably receiving said first pin element, and further defining a threaded screw-receiving opening extending between said central opening and a first of said width edges;

second and third substantially flat elements, each defining length dimensions substantially equal to said length dimensions of said first flat element, each defining width dimensions greater than said width dimension of said first flat element, and each defining a notch in a corner;

said second and third flat elements attached each to one side of said first flat element with said notches in alignment with each other and forming a U-shaped channel along a lengthwise edge of said first flat element and between said second and third flat elements; and a stopper element attached to said first end of said flexible line and positioned within said notches adjacent to said U-shaped channel, said stopper element dimensions preventing movement of said stopper element through said channel.

19. A ball mount as in claim 18 wherein said flexible line extends from said stopper element and through said channel.

20. A ball mount as in claim 19 further including a fastening element extending through said first end element and into said threaded opening for maintaining said holding means in substantially fixed position with respect to said first end element.

21. A ball mount as in claim 17 wherein said flexible line extends from said holding means, over said third pulley, over said first pulley, over said fourth pulley, over said second pulley, and outwardly beyond said first and second parallel elements.

22. A ball mounts as in claim 21 wherein said flexible line defines a second end positioned beyond said first and second parallel elements and further including:

a spring connected to said second end of said flexible line;

a turnbuckle connected to said spring; and means connected to said turnbuckle for enabling disconnecting of said towed vehicle from said towing vehicle.

23. A ball mount as in claim 5 further including a substantially U-shaped element of predetermined size for removable placement onto said third element and between said plate element and said ball mount receiver for preventing telescopic movement of said ball mount with respect to said ball mount receiver.

24. A ball mount as in claim 23 wherein said U-shaped element defines a pair of opposed side elements, said side elements defining opposed side element openings, and a pin element for removable insertion through said side element openings to hold said U-shaped element in position on said third element.

25. An automatic braking system including the ball mount of claim 1 and further including:

a cable housing for attachment to said towed vehicle; and a cable passing through said cable housing and adapted to be removably connected to a brake pedal of said towed vehicle, said cable connected to said disconnecting means for enabling said cable to be releasably connected to said flexible line.

* * * * *